United States Patent Office 2,993,046
Patented July 18, 1961

---

2,993,046
CONDENSED HETEROCYCLIC COMPOUNDS
Newman M. Bortnick, Oreland, and Marian F. Fegley, Mont Clare, Pa., assignors to Rohm & Haas Company, Philadelphia, Pa., a corporation of Delaware
No Drawing. Filed Mar. 3, 1958, Ser. No. 718,504
14 Claims. (Cl. 260—251)

This invention deals with specific condensed heterocyclic compounds as new compositions of matter. It also deals with a method for the preparation of these specific condensed heterocyclic compounds.

The compounds of this invention are prepared by reacting a ketonitrile having the formula

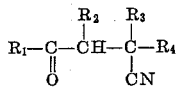

with a diprimary amine having the formula $NH_2QNH_2$ in a substantially equimolecular ratio, to be more fully explained hereinafter. The compounds of this invention may be represented by the formula

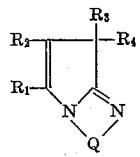

The symbol $R_1$ represents hydrocarbon groups of one to ten carbon atoms, preferably alkyl, aralkyl, cycloalkyl, aryl, and alkaryl. The symbol $R_2$ represents a hydrogen atom or an alkyl group of one to four carbon atoms. The symbols $R_3$ and $R_4$ may be hydrogen atoms or hydrocarbon groups containing from one to ten carbon atoms including alkyl, aralkyl, cycloalkyl, aryl, and alkaryl groups. In addition, $R_1$ and $R_2$ taken together with the carbon atoms to which they are joined may form a carbocyclic ring containing five to six carbon atoms which in turn may have alkyl substituents containing a total of no more than four additional carbon atoms. In addition, $R_2$ and $R_3$ taken together with the carbon atoms to which they are joined may form a carbocyclic ring containing five to six carbon atoms which in turn may have alkyl substituents containing a total of no more than four additional carbon atoms. In addition, $R_3$ and $R_4$ when taken together with the carbon atom to which they are joined may form a carbocyclic ring containing five to six carbon atoms which in turn may have alkyl substituents containing a total of no more than four additional carbon atoms. The total number of carbon atoms in the ketonitrile should not exceed 24. The preferred embodiments are those in which $R_1$ and $R_4$ are alkyl groups, $R_2$ is a hydrogen atom, and $R_3$ is a methyl group. $R_1$, $R_3$, and $R_4$ may typically individually represent methyl, butyl, octyl, benzyl, phenylbutyl, cyclopentyl, cyclohexyl, phenyl, naphthyl, butylphenyl groups, and the like.

Typical ketonitrile reactants include 4-oxopentanonitrile, 3 - methyl - 4 - oxopentanonitrile, 2,2-dimethyl-4-oxopentanonitrile, 2 - methyl - 2 - ethyl - 4 - oxopentanonitrile, 2,6-dimethyl - 2 - (2-methylpropyl) - 4 - oxoheptanonitrile, 2-methyl-2-propyl-4-oxoheptanonitrile, 2-methyl-2-(2,2,4,4-tetramethylpentyl) - 4 - oxopentanonitrile, 2-methyl-2-ethyl-4-oxoheptanonitrile, 2-methyl-2-hexyl - 4 - oxodecanonitrile, 2 - methyl-2-neopentyl-4-oxopentanonitrile, 2-methyl-2,4-diphenyl-4-oxobutanonitrile, 1 - (2 - oxocyclohexyl)-cyclohexanecarbonitrile, 2-methyl-2,4-dicyclohexyl - 4 - oxobutanonitrile, α,α,4-trimethyl-2-oxocyclohexaneacetonitrile, 2 - acetyl-1-methylcyclopentanecarbonitrile, 1 - butyl-2-methyl-3-oxocyclopentanecarbonitrile, 1 - (2-oxocyclopentyl)cyclohexanecarbonitrile, 1-(1-pentyl-2-oxooctyl)cyclopentanecarbonitrile, 3,3 - dimethyl-2-(2-oxopropyl)-bicyclo-[2.2.1]heptane-2-carbonitrile, 2 - benzoyl-1-methylcyclopentanecarbonitrile, and 2-butyl-2-naphthyl-4-oxobutanonitrile.

The symbol Q represents a chain of two to three carbon atoms between the two nitrogen atoms to which it is joined. Q may be a straight chain alkylene group, an alkyl-substituted alkylene group, or a cycloalkyl, aryl, or aralkyl group as long as there are no more than two to three carbon atoms between the two primary amino groups. While the upper limit of carbon atoms in Q is not especially critical, about 18 is considered the practical upper limit. Also, while the group Q may contain alkyl substituents, it is necessary that the carbon atom directly attached to the primary amino group bear at least one hydrogen atom. Otherwise, the reaction is sterically hindered and not consummated.

Typical $NH_2QNH_2$ reactants are $NH_2CH_2CH_2NH_2$ $NH_2CH_2CH_2CH_2NH_2$

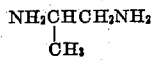

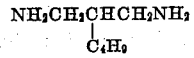

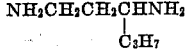

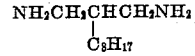

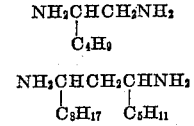

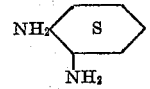

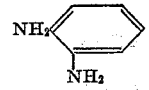

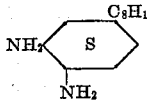

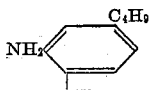

and

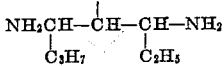

The present reaction is conducted under conditions whereby water and ammonia are split out and removed. It is preferred to conduct the reaction in the presence of an inert volatile organic solvent that forms an azeotrope with water. Useful as solvent in this respect are benzene, toluene, xylene, heptane, hexene, methylene chloride, chloroform, and the like. If the $NH_2QNH_2$ reactant is insoluble in water an excess of that reactant may be employed as the solvent. The water is removed azeotropically as the reaction progresses, preferably at about 40° to 250° C. The reaction is desirably terminated when the substantially theoretical amount of water is removed. The product may be isolated by distillation under reduced pressure or recrystallization from a solvent, such as isooctane, as desired. If the diprimary amino reactant has been used in excess to permit it to serve also as a solvent, it has to be separated from the product at the conclusion of the reaction, by conventional methods.

The products of this invention are useful as hypotensive agents without exhibiting any substantial undesirable side effects. This is surprising in that, while the present compounds are indeed novel, compounds that possess some structural similarities exhibit entirely opposite effects. Particularly outstanding in this hypotensive respect is the product having the formula

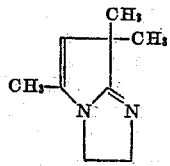

The present products are also useful as fungicides, especially when applied against *Stemphylium sarcinaeforme* and *Monilinia fructicola* and evaluated according to standard methods. Concentrations in amounts down to about 0.005% are effective in the above stated use without exhibiting any appreciable phytotoxicity. Especially effective in this respect are those products having the formulas

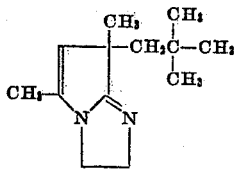

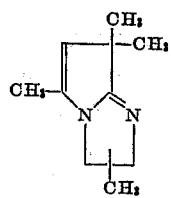

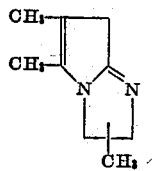

and

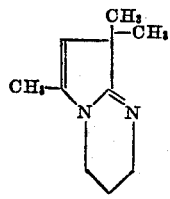

The compounds of this invention have been presented in their free-base form and in this free-base form, they possess the valuable characteristics and concurrent utilities previously referred to. However, it is to be construed that the present invention includes the salts of these free-base products also. It is desirable, in some instances, to employ the present products in their water-soluble salt form. For instance, in pesticidal applications, it is highly desirable to deal with water-soluble compounds in order that satisfactory spray solutions may be formulated. In other applications, wherein physiological benefits are desired, it is frequently advantageous to employ the present products in their physiologically acceptable organic salt form in order to provide the stability and physiological tolerance required.

In order to prepare the salt forms of the present compounds, it is necessary only to react these compounds with a stoichiometric amount of the selected acid. The salt formation occurs readily at room temperature without the aid of a catalyst. If solid reactants are employed, it may be advantageous to use an inert volatile solvent such as benzene, toluene, xylene, hexane, heptane, methylene chloride, chloroform, or the like. The solvent can then be readily removed at the conclusion of the reaction by conventional methods. The salt product does not require any further purification, although recrystallization from a solvent such as isooctane may be resorted to if a product of high purity is demanded.

While it is believed clear to one skilled in the art from the above description how the salts are prepared, such salt formation may be specifically illustrated by indicating that one would take an equivalent amount of a selected compound of this invention in its free-base form and then add a stoichiometric amount of a selected acid which would, for instance, be 36.5 parts of hydrochloric acid, 98 parts of sulfuric acid, 60 parts of acetic acid, 72 parts of acrylic acid, and the like. The corresponding hydrochloric, sulfuric, acetic and acrylic acid salts, respectively, are readily formed. Similarly, other salt products may be prepared.

Typical organic and inorganic acids that may be employed are formic acid, acetic acid, propionic acid, butyric acid, caproic acid, capric acid, lauric acid, myristic acid, palmitic acid, stearic acid, acrylic acid, methacrylic acid, crotonic acid, undecylenic acid, oleic acid, linoleic acid, linolenic acid, ricinoleic acid, propiolic acid, butynoic acid, cyclobutanecarboxylic acid, norcamphane-2-carboxylic acid, benzoic acid, resorcylic acid, oxalic acid, succinic acid, glutaric acid, adipic acid, sebacic acid, salicylic acid, maleic acid, fumaric acid, glutaconic acid, saccharic acid, dodecanedioic acid, octendioic acid, cyclohexaneacetic acid, cyclopentaneacetic acid, tridecanoic acid, hexynedioic acid, phthalic acid, cinnamic acid, benzenesulfonic acid, ethanesulfonic acid, naphthalenesulfonic acid, toluenesulfinic acid, glutamic acid, glyoxalic acid, phenylglyoxalic acid, pyruvic acid, levulinic acid, glycine, aminocaproic acid, hydrochloric acid, hydrobromic acid, sulfuric acid, perchloric acid, carbonic acid, nitric acid, and phosphoric acid.

The compounds of this invention, as well as the methods for their preparation, may be more fully understood from the following examples which are offered by way of illustration and not by way of limitation. Parts by weight are used throughout.

*Example 1*

Benzene (300 parts), 2,2-dimethyl-4-oxopentanonitrile (625 parts), and ethylenediamine (600 parts) are placed in the pot of a fractionation column fitted with a water separator and reflux condenser. The mixture is boiled under reflux until the theoretical amount of water (90 parts) separates. The solvent and excess ethylenediamine are removed by stripping under reduced pressure. The residue is distilled under reduced pressure and the cut (boiling point 90°–136° C. at 1 mm. absolute pressure) is heated at 180°–210° C. for 28 hours until ammonia evolution ceases. The product is then isolated by distillation and has a boiling point of 207°–208° C. at 760 mm. absolute pressure and an $n_D^{25}$ value of 1.5126.

The product contains 18.6% nitrogen (theoretical 18.7%). The yield is 600 parts (80% of theory) and the product has a neutralization equivalent of 149 (theoretical 150). The product is identified as 2,3-dihydro-5,7,7-trimethyl-(7H)-imidazo-[1,2-a]pyrrole.

In a similar fashion, 3-methyl-4-oxopentanonitrile gives 2,3-dihydro-5,6-dimethyl - (7H)-imidazo[1,2-a]pyrrole; 2-methyl-2-hexyl-4-oxodecanonitrile gives 2,3-dihydro-5,7 - dihexyl-7-methyl-(7H)-imidazo[1,2 - a]pyrrole; 2,6-dimethyl-2-(2-methylpropyl)-4-oxoheptanonitrile gives 7-methyl-5,7-bis(2-methylpropyl) - 2,3 - dihydro-(7H)-imidazo[1,2-a]pyrrole; and 2-methyl-2-(2,2-dimethylpropyl)-4-oxopentanonitrile gives 2,3-dihydro-5,7-dimethyl-7-(2,2-dimethylpropyl)-(7H)-imidazo[1,2 - a]pyrrole on treatment with ethylenediamine.

Example 2

Benzene (30 parts), 2,2-dimethyl-4-oxopentanonitrile (63 parts), and 1,2-diaminopropane (74 parts) are combined in a flask fitted with a fractionation column and a water separator capped by a reflux condenser. Water is removed azeotropically, the major amount being removed during the first hour of a 6.5 hour reflux period. The benzene and excess 1,2-diaminopropane are removed at atmospheric pressure and the residue is heated to a pot temperature of 215° C. Fractional distillation of this material through a short packed column gives the product, 2,3-dihydro-2,(or 3),5,7,7-tetramethyl-(7H)-imidazo-[1,2-a]pyrrole, which has a boiling point of 67° C. (4 mm. absolute pressure) and an $n_D^{25}$ value of 1.5010. The product is obtained in a yield of 80%, contains 17.0% nitrogen (17.1% theoretical), and has a neutral equivalent of 164 (theoretical 164).

In a similar fashion, 2-methyl-2,4-diphenyl-4-oxobutanonitrile gives 2 (or 3),7-dimethyl-5,7-diphenyl-2,3-dihydro-(7H)-imidazo[1,2-a]pyrrole, 2 - acetylcyclohexanecarbonitrile gives 2 (or 3), 5-dimethyl-2,3,6,7,8,9-hexahydro-(9aH)-isoindolo[1,2-a]-imidazole, 3,3-dimethyl-2-(2-oxopropyl)bicyclo(2.2.1)heptane-2 - carbonitrile gives {3,3-dimethylbicyclo(2.2.1)heptane-2,7'[2' (or 3')-5'-dimethyl-2',3' - dihydro-(7'H)-imidazo[1,2-a]pyrrole} and α,α,4-trimethyl-2-oxocyclohexaneacetonitrile gives 2 (or 3),6,9,9-tetramethyl-2,3,5,6,7,8-hexahydro-(9H)-indolo[1,2-a]imidazole.

Example 3

Benzene (25 parts), 2,2-dimethyl-4-oxopentanonitrile (63 parts), and 1,3-diaminopropane (74 parts), are combined in a reactor fitted with a distillation column, water separator, and reflux condenser. The mixture is heated under reflux for four hours during which time the theoretical amount of water separates. The benzene is distilled off and the residue is heated to a temperature of 230° C. The mixture is then distilled under reduced pressure to give the product, 6,8,8-trimethyl-2,3,4,8-tetrahydropyrrolo[1,2-a]pyrimidine (70 parts). The product has a boiling point of 75° C. (3 mm. absolute pressure). The product contains 17.1% nitrogen (theoretical 17.1%) and has an $n_D^{25}$ value of 1.5238.

In the same manner, 1-(2-oxocyclohexyl)-cyclohexanecarbonitrile gives spiro {cyclohexane-1,10'[2',3',4',6',7',8',9',10'-octahydroindolo[1,2-a]pyrimidine]}, 2-acetylcyclohexanecarbonitrile gives 6-methyl-2,3,4,7,8,9,10,10a-octahydroisoindolo[1,2-a]-pyrimidine, and 2-methyl-2-(2,2-dimethylpropyl)-4-oxopentanonitrile gives 6,8-dimethyl - 8-(2,2-dimethylpropyl)-2,3,4,8 - tetrahydropyrrolo-[1,2-a]pyrimidine.

Example 4

Toluene (100 parts), 2,2-dimethyl-4-oxopentanonitrile (63 parts), and ortho-phenylenediamine (60 parts), are heated to reflux in a reactor fitted with a water separator. A small amount of dry hydrogen chloride is admitted as a catalyst. A vigorous reaction occurs, ammonia is evolved, and water is collected in the separator. The product, 1,3,3-trimethyl-(3H)-pyrrolo[1,2-a]benzimidazole, is obtained in a yield of 78 parts and melts at 180°–189° C. It is easily hydrolyzed in the course of isolation and crystallization to give 1-(2-aminophenyl)-2,4,4-trimethyl-2-pyrrolin-5-one which has a melting point of 201.5°–204° C.

Similar products are obtained by heating ortho-phenylenediamine with α,α,4-trimethyl-2-oxocyclohexaneacetonitrile and with 1-(2-oxocyclohexyl)cyclohexanecarbonitrile.

We claim:

1. As a composition of matter, a member from the class consisting of

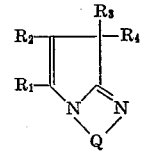

and the acid addition salts thereof, in which $R_1$ taken individually represents a member from the class consisting of alkyl, phenylalkyl, cycloalkyl, phenyl, naphthyl, and alkylphenyl groups of no more than 10 carbon atoms, $R_2$ taken individually represents a member from the class consisting of a hydrogen atom and an alkyl group of 1 to 4 carbon atoms, $R_3$ and $R_4$ taken individually represent members from the class consisting of alkyl, cycloalkyl, phenylalkyl, phenyl, naphthyl, and alkylphenyl groups of no more than 10 carbon atoms, $R_1$ and $R_2$ taken collectively with the carbon atoms to which they are joined form a member from the class consisting of a carbocyclic ring of 5 to 6 carbon atoms and one olefinic bond, and said ring having alkyl substituents consisting of a total of no more than 4 carbon atoms, $R_2$ and $R_3$ taken collectively with the carbon atoms to which they are joined form a member from the class consisting of a saturated carbocyclic ring of 5 to 6 carbon atoms and said ring having alkyl substituents consisting of a total of no more than 4 carbon atoms, and $R_3$ and $R_4$ taken collectively with the carbon atoms to which they are joined form a member from the class consisting of a saturated carbocyclic ring of 5 to 6 carbon atoms and said ring having alkyl substituents consisting of a total of no more than 4 carbon atoms, and Q is a hydrocarbon chain of 2 to 3 carbon atoms between the nitrogen atoms to which it is joined, said Q containing up to about 18 carbon atoms.

2. As a composition of matter, the compound having the formula

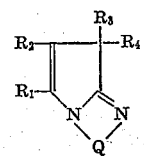

in which $R_1$ is an alkyl group of 1 to 10 carbon atoms, $R_2$ is a hydrogen atom, $R_3$ is an alkyl group of 1 to 10 carbon atoms, $R_4$ is an alkyl group of 1 to 10 carbon atoms, and Q represents an ethylene group.

3. As a composition of matter, the compound having the formula

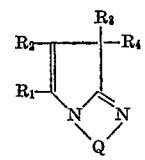

in which $R_1$ and $R_4$ are alkyl groups of 1 to 10 carbon atoms, $R_2$ is a hydrogen atom, and $R_3$ is a methyl group, and Q represents an ethylene group.

4. As a composition of matter, the compound having the formula

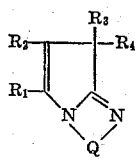

in which $R_1$ and $R_2$ taken collectively with the carbon atoms to which they are joined form a carbocyclic ring of 5 to 6 carbon atoms and one olefinic bond, $R_3$ and $R_4$ are alkyl groups of 1 to 10 carbon atoms, and Q is an ethylene group.

5. As a composition of matter, the compound having the formula

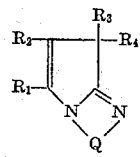

in which $R_1$ is an alkyl group of 1 to 10 carbon atoms, $R_2$ and $R_3$ taken collectively with the carbon atoms to which they are joined form a saturated carbocyclic ring of 5 to 6 carbon atoms, $R_4$ is an alkyl group of 1 to 10 carbon atoms, and Q is an ethylene group.

6. As a composition of matter, the compound having the formula

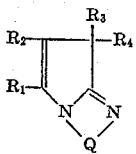

in which $R_1$ is an alkyl group of 1 to 10 carbon atoms, $R_2$ is an alkyl group of 1 to 4 carbon atoms, and $R_3$ and $R_4$ taken collectively with the carbon atom to which they are joined form a saturated carbocyclic ring of 5 to 6 carbon atoms, and Q is an ethylene group.

7. As a composition of matter, 2,3-dihydro-5,7,7-trimethyl-(7H)-imidazo-[1,2-a]pyrrole.

8. As a composition of matter, 2,3-dihydro-2,5,7,7-tetramethyl-(7H)-imidazo[1,2-a]pyrrole.

9. As a composition of matter, 6,8,8-trimethyl-2,3,4,8-tetrahydropyrrolo[1,2-a]pyrimidine.

10. As a composition of matter, 1,3,3-trimethyl-(3H)-pyrrolo[1,2-a]benzimidazole.

11. As a composition of matter, spiro{cyclohexane-1,9'-[2',3',4',6',7',8',9',10' - octahydroindolo[1,2-a]pyrimidine]}.

12. A method for the preparation of a compound having the formula

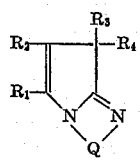

in which $R_1$ taken individually represents a member from the class consisting of alkyl, phenylalkyl, cycloalkyl, phenyl, naphthyl, and alkylphenyl groups of no more than 10 carbon atoms, $R_2$ taken individually represents a member from the class consisting of a hydrogen atom and an alkyl group of 1 to 4 carbon atoms, $R_3$ and $R_4$ taken individually represent members from the class consisting of alkyl, cycloalkyl, phenylalkyl, phenyl, naphthyl, and alkylphenyl groups of no more than 10 carbon atoms, $R_1$ and $R_2$ taken collectively with the carbon atoms to which they are joined form a member from the class consisting of a carbocyclic ring of 5 to 6 carbon atoms and one olefinic bond, and said ring having alkyl substituents consisting of a total of no more than 4 carbon atoms, $R_2$ and $R_3$ taken collectively with the carbon atoms to which they are joined form a member from the class consisting of a saturated carbocyclic ring of 5 to 6 carbon atoms and said ring having alkyl substituents consisting of a total of no more than 4 carbon atoms, and $R_3$ and $R_4$ taken collectively with the carbon atoms to which they are joined form a member from the class consisting of a saturated carbocyclic ring of 5 to 6 carbon atoms and said ring having alkyl substituents consisting of a total of no more than 4 carbon atoms, and Q is a hydrocarbon chain of 2 to 3 carbon atoms between the nitrogen atoms to which it is joined, said Q containing up to about 18 carbon atoms, which comprises bringing together and thereby causing to react in the temperature range of about 40° to 250° C., the compound having the formula

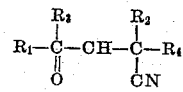

with one having the formula $NH_2QNH_2$.

13. A method according to claim 12 in which the reaction is conducted in the presence of an inert volatile organic solvent that forms an azeotrope with water.

14. A method according to claim 12 in which the reaction is conducted in the presence of an inert volatile organic solvent that forms an azeotrope with water and the water that is formed is removed azeotropically as the reaction progresses.

References Cited in the file of this patent

Ochiai: J. Pharm. Soc. Japan (1939), vol. 58, pages 84–8 as abstracted in Chem. Absts., vol. 53 (1939), col. 3791.